US006711005B2

(12) United States Patent
Martin

(10) Patent No.: US 6,711,005 B2
(45) Date of Patent: Mar. 23, 2004

(54) SMALL COMPUTING DEVICE HAVING A LIGHT SOURCE

(75) Inventor: Cindy L. Martin, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 09/950,182

(22) Filed: Sep. 10, 2001

(65) Prior Publication Data

US 2003/0048599 A1 Mar. 13, 2003

(51) Int. Cl.[7] .................................................. G06F 1/16
(52) U.S. Cl. ....................... 361/683; 361/679; 361/686; 362/88; 379/110.01
(58) Field of Search ................................ 361/683, 687, 361/699, 700, 684–685, 680, 686; 362/253, 154, 155, 276, 287, 318, 302, 116; 345/168, 170, 157, 183; 364/900, 708.1; 312/257, 265.5; D26/93, 43, 102–112, 60–63; D14/218, 432, 439; 349/1, 58, 65, 665

(56) References Cited

U.S. PATENT DOCUMENTS 5,815,225 A  *  9/1998  Nelson ........................ 349/65
5,901,206 A  *  5/1999  Soon ...................... 379/110.01
D435,679 S  * 12/2000  Nahdi et al. ................ D26/103
6,161,944 A  * 12/2000  Leman ........................ 362/276
6,341,871 B1  *  1/2002  Angelopoulos ............... 362/23
6,380,921 B2  *  4/2002  Nakamura ................... 345/102
6,435,690 B1  *  8/2002  Till .............................. 362/88
6,462,941 B1  * 10/2002  Hulick et al. ............... 361/683
6,504,708 B2  *  1/2003  Yehudai ...................... 361/683
6,518,926 B2  *  2/2003  Hulick et al. ................ 343/702

FOREIGN PATENT DOCUMENTS

JP          09211448 A  *  8/1997  ........... G02F/1/335
JP       2001325043 A  * 11/2001  ............. G06F/1/16

OTHER PUBLICATIONS

U.S. patent application Publication US 2002/00676088A1, by Kruse et al.*
U.S. patent application Publication US 2001/0024500A1, by Sharpe.*

* cited by examiner

Primary Examiner—Michael Datskovsky

(57) ABSTRACT

The present disclosure relates to a small computing device. In one arrangement, the device comprises an internal computer, a power source, and a light source that is adapted to emit light out from the small computing device to illuminate surroundings in which the small computing device is used.

9 Claims, 4 Drawing Sheets

SMALL COMPUTING DEVICE HAVING A LIGHT SOURCE

FIELD OF THE INVENTION

The present disclosure relates to a small computing device having a light source. More particularly, the disclosure relates to a personal digital assistant having a light source that can be used to illuminate the user's surroundings where little ambient light exists.

BACKGROUND OF THE INVENTION

Personal computing devices have become very popular in recent years. Many persons use these devices to keep track of various information including their contact information (including phone numbers, addresses, etc.) and their calendar (including scheduled appointments, meetings, etc.). Due to the portability of such devices, many persons carry the devices with them nearly at all times. Accordingly, these persons normally have quick access to their computing devices.

Because of the convenience provided to users with personal computing devices, these devices are often viewed as a personal assistant on which the user can rely for several different purposes. Although several of these devices provide many different features, other useful features could be provided. For instance, in that the personal computing device is often carried with the user from place to place, it would be convenient if the device were provided with a light source such that the device could be used as a flashlight in low light conditions.

SUMMARY OF THE INVENTION

The present disclosure relates to a small computing device. In one arrangement, the device comprises an internal computer, a power source, and a light source that is adapted to emit light out from the small computing device to illuminate surroundings in which the small computing device is used.

In a preferred arrangement, the small computing device comprises a personal digital assistant that includes an internal computer including a processing device and memory, an internal battery, a display, at least one control button, and a light source that is adapted to emit light out from the personal digital assistant to illuminate surroundings in which the personal digital assistant is used.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Disclosed herein is a small computing device that has a light source that can be used to illuminate the environment in which the device is used. As used herein, the term "small computing device" denotes portable computing devices of the type that can easily be carried by the user. Common names for such devices include, for instance, personal digital assistant (PDA), palmtop, pocket personal computer (PC), handheld PC, etc. As will be apparent from the discussion that follows, the small computing device is distinct from other devices that merely contain internal circuitry (e.g., calculator) in that the former are miniaturized versions of the common PC or laptop. Accordingly, small computing devices are actually minicomputers comprising many of the components commonly found in other, less portable computers.

To facilitate description of the invention, an example small computing device will be discussed with reference to the figures. Although this device is described in detail, it will be appreciated that the device is provided for purposes of illustration only and that various modifications are feasible without departing from the inventive concept. After the example small computing device has been described, its use will be discussed.

Figure 1:
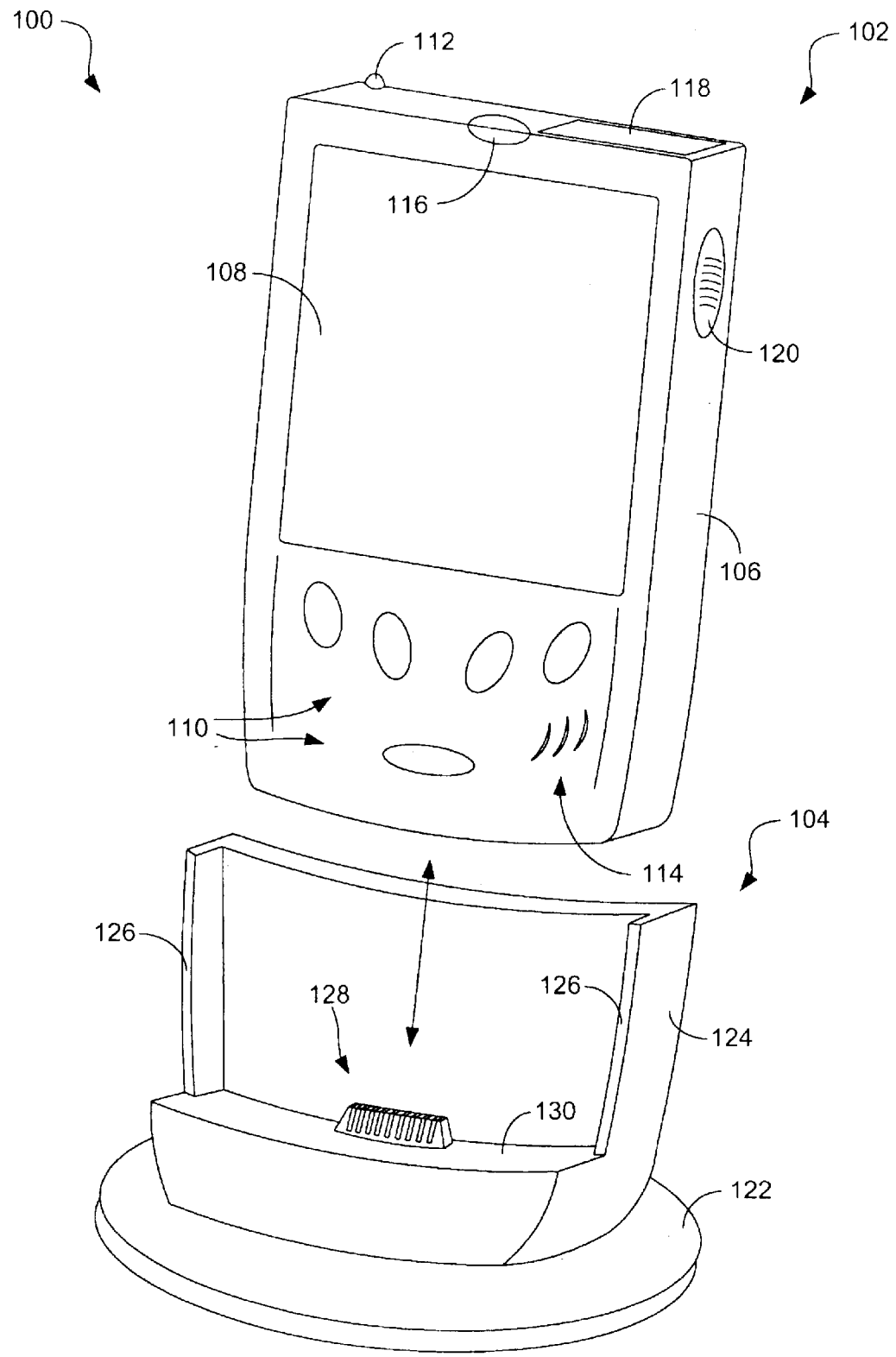
FIG. 1 is a schematic perspective view of example computing apparatus.

Referring now in more detail to FIG. 1, illustrated is example computing apparatus 100. As shown in this figure, the apparatus 100 can comprise a small computing device 102 having an outer housing 106. The housing 106 can be sized in shaped to fit within the palm of the user's hand (see FIG. 4). Although such a size and shape may be preferable in some embodiments, it will be appreciated that other sizes and/or shapes are possible.

The outer housing 106 is configured to accommodate a display 108 and one or more control buttons or keys 110. By way of example, the display 108 comprises a liquid crystal display (LCD) and is used to convey various information to the user. Optionally, the display 108 can comprise a touch-sensitive LCD or other touch-sensitive display with which the user can make selections onscreen as well as enter information through use of a stylus 112 that, for instance, removably mounts to a rear side of the small computing device 102. The control buttons 110 can, like the stylus 112, be used to make selections and enter information into the small computing device 102. By way of example, each button 110 can be preprogrammed for a particular purpose and/or one or more of the buttons can be programmable by the user so as to be usable as a "shortcut" key. The buttons 110 that are preprogrammed can be configured to, for instance, turn the power on and off, open a home menu, open a contacts list, open a calendar, open a tasks list, etc.

In addition to the display 108 and buttons 110, the small computing device 102 can further include a speaker 114 and a signaling light emitting diode (LED) 116, each of which can be used to alert the user as to a particular condition (e.g., time for a scheduled meeting). In addition, the speaker 114 can further be used for "playing" various recorded sounds (e.g., voice memoranda).

As is further identified in FIG. 1, the small computing device 102 also comprises a light source 118 and, at least in some embodiments, a light source control button 120. The light source 118 typically is provided at a top end of the small computing device 102 such that the device can be used in similar manner to a flashlight as needed. The light source control button 120, where provided, is normally positioned at a convenient location on the outer housing 106 so as to be easily accessible to the user when the small computing device 102 is used for illumination. For example, as shown in FIG. 1, the button 120 can be provided on a side of the housing 106 so as to be manipulable with the user's thumb (see FIG. 4). Notably, however, the location of the control button 120, as well as the light source 118, can be different in alternative arrangements within the skill of persons having ordinary skill in the art. As is described below, the light source control button 120 is connected to an internal switch that controls whether power is provided to the light source 118.

As will be readily appreciated by persons having ordinary skill in the art, the small computing device 102 can possess many features beyond those described above in relation to FIG. 1. For instance, the small computing device 102 can further include a data port used to electrically connect to another computing device (e.g., personal computer (PC)), a record button that is used to initiate and terminate recording of voice memoranda, a microphone that is used to record the memoranda, an "action" wheel that can be used to scroll through documents and menus, a transceiver that is adapted to wirelessly transmit data to and receive data from another computing device, a cover that is used to protect the display 108, and so forth.

When the small computing device 102 is adapted to electrically connect to a PC, for example to synchronize with the PC and therefore share information with it, the apparatus 100 can further include a cradle or docking station 104. As shown in FIG. 1, the cradle 104 can generally comprise a base 122 and a device support 124. The base 122 typically comprises a substantially planar member that is adapted for placement on flat surfaces such as a desk. The device support 124 typically comprises a support wall 126 and, optionally, lateral support flanges 126, which provide support to the small computing device 102 when it is disposed within the cradle 104. Normally, the cradle 104 further includes a data connector 128 that is adapted to mate with an appropriate data port (not shown) of the small computing device 102. By way of example, where the data port is provided on a bottom end of the small computing device 102, the data connector 128 can be formed on an upper surface 130 of the device support 124. In addition to these elements, the cradle 104 can include a connection cable (not shown) that is terminated with a connector which is adapted for connection to a PC.

Figure 2:
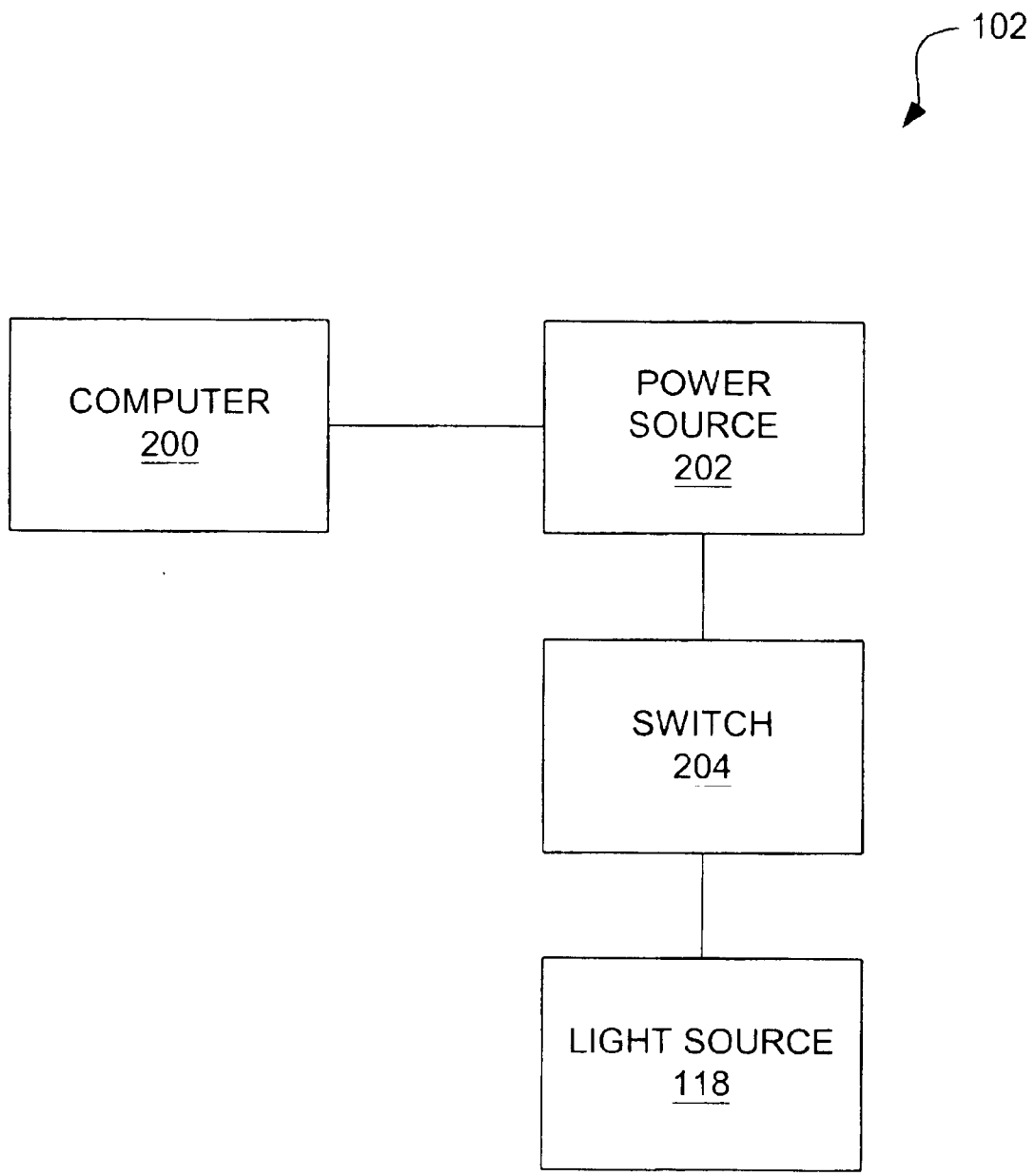
FIG. 2 is a block diagram identifying various components of a small computing device shown in FIG. 1.
Figure 3:
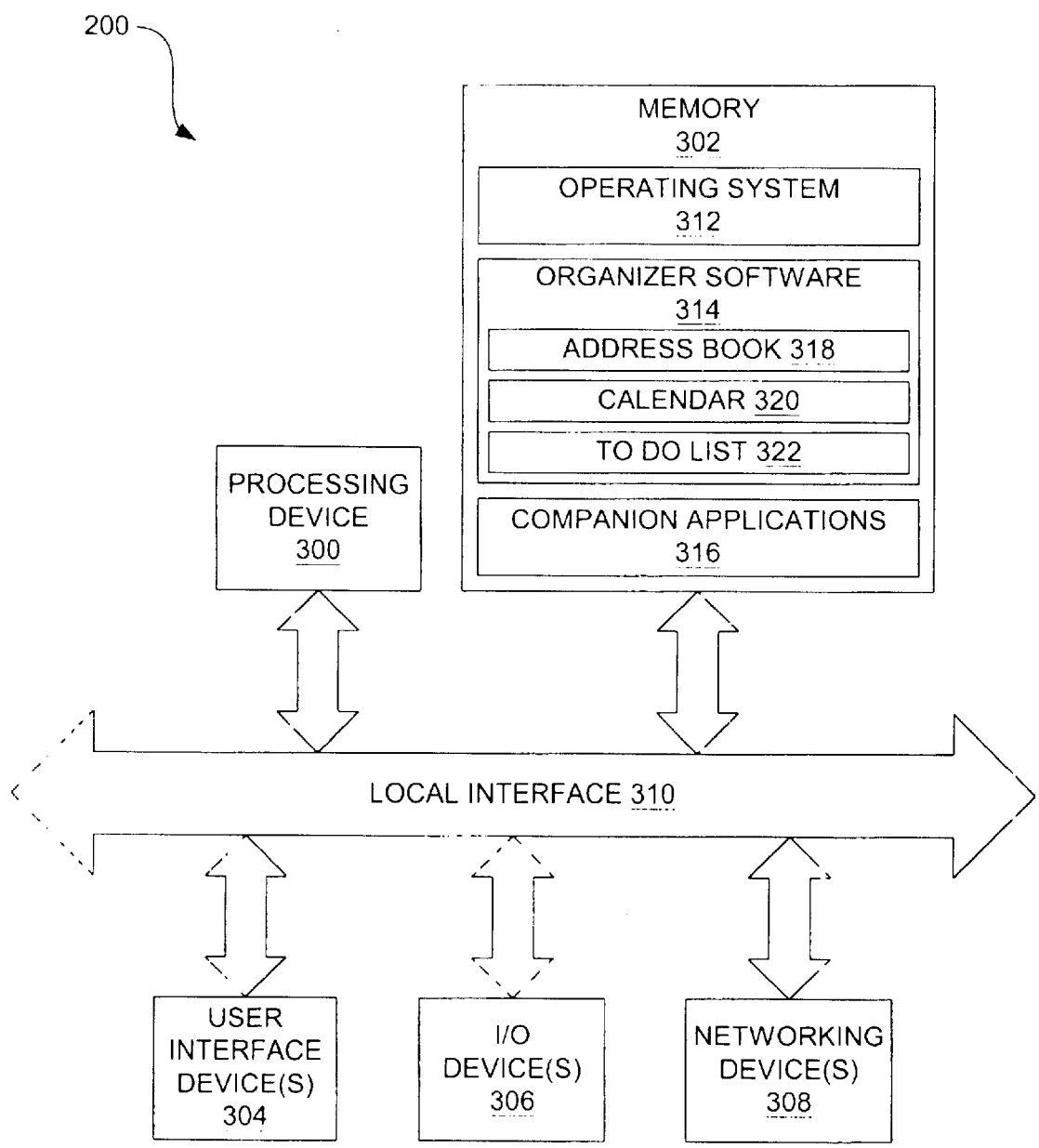
FIG. 3 is a schematic view of a computer identified in FIG. 2.

Referring now to FIG. 2, illustrated is a block diagram of the architecture of the small computing device 102. As shown in this figure, the small computing device 102 generally comprises an internal computer 200 that, as discussed below with reference to FIG. 3, provides the computing power of the small computing device. In addition, the device 102 comprises an internal power source 202, the light source 118 illustrated in FIG. 1, and an internal switch 204 that is disposed between the power source and the light source so as to control operation of the light source. The power source 202 typically comprises a disposable or rechargeable battery. By way of example, the light source 118 can comprise an incandescent lamp. However, it is to be understood that the light source 118 can comprise substantially any element capable of generating sufficient light to illuminate the user's immediate surroundings. Therefore, the light source 118 can comprise, for example, a florescent lamp, halogen lamp, LED, or combinations thereof. The switch 204 can likewise take many different possible forms. For example, the switch 204 can comprise a simple on/off switch. In other embodiments, the switch 204 can be adapted to provide power to the light source 118 when the switch is placed in an on position and/or for as long as the user depresses the button 120. Persons having ordinary skill in the art will appreciate that many different variations for both the light source 118 and switch 204 are feasible and may even be preferable in some embodiments.

FIG. 3 is a schematic view illustrating an example architecture of the internal computer 200 identified in FIG. 2. As indicated in FIG. 3, the computer 200 can comprise a processing device 300, memory 302, user interface devices 304, I/O devices 306, and networking devices 308. Each of these components is connected to a local interface 310 that, by way of example, comprises one or more internal buses. The processing device 300 is adapted to execute commands stored in memory 302 and can comprise a general-purpose processor, a microprocessor, one or more application-specific integrated circuits (ASICs), a plurality of suitably configured digital logic gates, and other well known electrical configurations comprised of discrete elements both individually and in various combinations to coordinate the overall operation of the small computing device 102.

The user interface devices 304 typically comprise interface tools with which the device settings can be changed and through which the user can communicate commands directly to the small computing device 102. As noted above, the display 108 (where touch-sensitive) and the buttons 110 can form part of the user interface devices 304. The I/O devices 306 comprise components used to facilitate connection of the small computing device 102 to other devices, such as the cradle 104 and, as noted above, typically comprises a data port. By way of example, the I/O devices 306 can comprise one or more serial, parallel, small system interface (SCSI), universal serial bus (USB), IEEE 1394 (e.g., Firewire™), or personal area network (PAN) connection devices. Where provided, the networking devices 308 comprise the various components used to wirelessly transmit and/or receive data over a network. By way of example, the networking devices 308 include a device that communicates both inputs and outputs, for instance, a modulator/demodulator (e.g., modem), a transceiver (e.g., radio frequency (RF) or infrared (IR)), a telephonic interface, a network card, etc. Although particular examples of I/O devices 306 and networking devices 308 have been identified, it will be understood that these examples are provided for illustration only and that other options exist.

The memory 302 includes various software (e.g., firmware) programs including an operating system 312, organizer software 314, and various companion applications 316. The operating system 312 contains the various commands used to control the general operation of the small computing device 102. The organizer software 314 provides the basic utility of the small computing device 102 when acting in the capacity of a personal assistant. Accordingly, the organizer software 314 can include an address book 318, calendar 320, to do list 322, and the like. As known in the art, several different software packages are currently available which offer such features. For example, a small computing device version of Microsoft Outlook™ is available under the name Pocket Outlook™. Where provided, the companion applications 316 comprise various programs suited for particular different functionalities. By way of example, these programs can include a word processing program (e.g., Microsoft Word™), spreadsheet program (e.g., Microsoft Excel™), financial tracking program (e.g., Microsoft Money™), game programs, etc.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical copying of the paper or other medium, then compiled, interpreted or otherwise processed in a suitable manner if necessary, and then stored in a computer memory.

Figure 4:
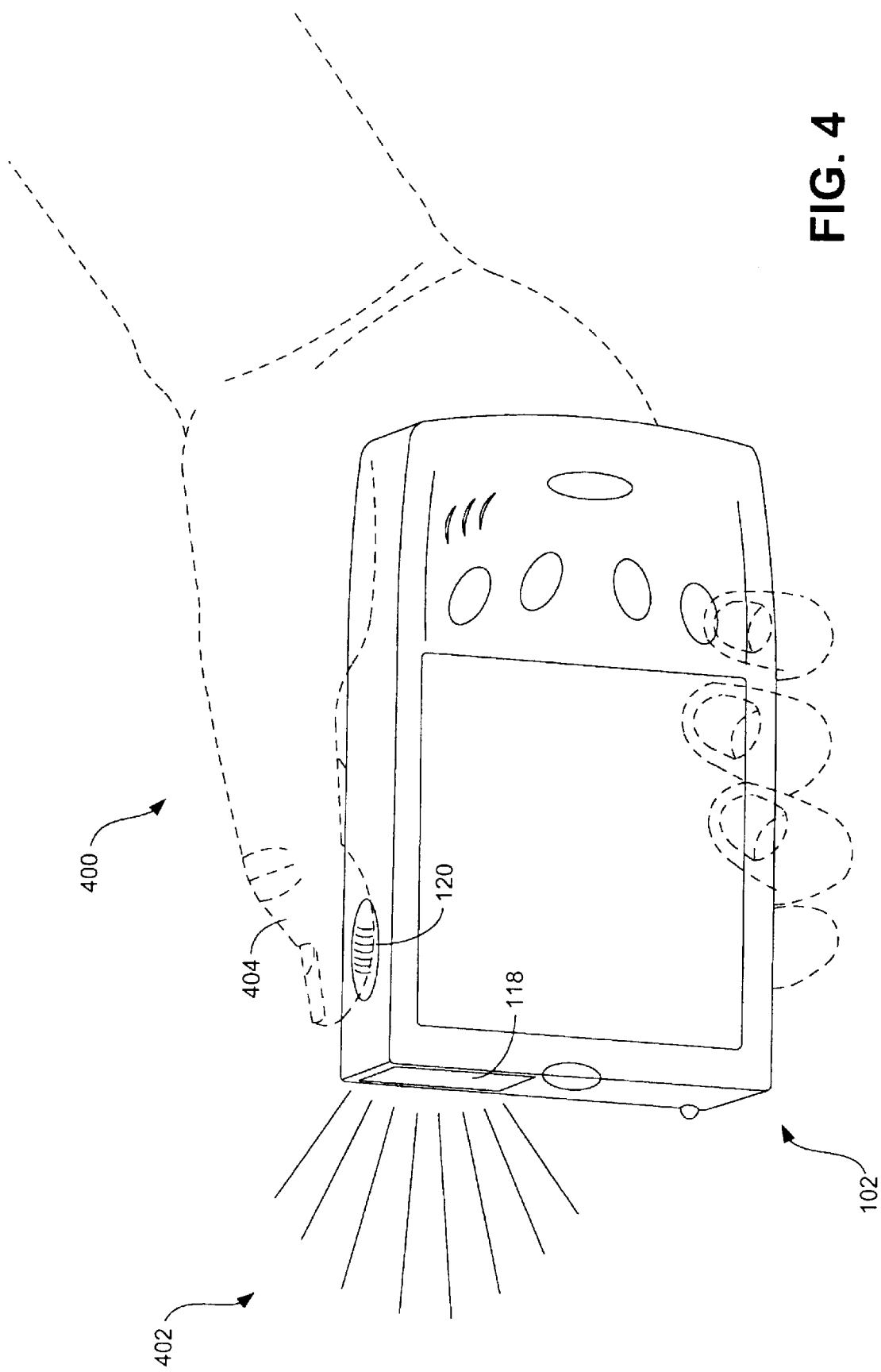
FIG. 4 is a schematic perspective view illustrating use of the small computing device shown in FIG. 1.

An example small computing device 102 having been described above, operation of the device in illuminating the user's surroundings will now be discussed. As noted above, the light source 118 typically is positioned on the small computing device 102 so as to be conveniently positioned to shine light outwardly. When the device 102 is held in the same manner as a flashlight, the control button 120 is easily accessible by the user, for example with the user's thumb. This arrangement is depicted in FIG. 4. As shown in this figure, the small computing device 102 can be held in the palm of the user's hand 400 such that the light 402 emitted by the source 118 can be directed away from the user's body. When held in this manner, the user can activate the control button 120 with the thumb 404. Operating in this manner, the small computing device 102 can be used to illuminate the user's surroundings in low light conditions. As a consequence, the small computing device 102 is well-suited for use in an emergency in which the user needs light.

In another operating environment, the light source 118 can be controlled by entering selections with the user interface devices 304, such as with the display 108 and/or buttons 110. In such a scenario, the user opens an applicable control screen and can select "on" from the screen to cause power to be provided to the light source 118. Where the light source 118 is activated in this manner, the user can further select a time period after which the light source will be automatically turned off to conserve power.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A computing device comprising:
    an internal processing device and memory, the memory comprising a control application;
    a touch-sensitive display that enables commands to be entered;
    a light source that emits light to illuminate surroundings in which the device is used;
    a control button that controls illumination of the light source; and
    an internal battery that provides power to the internal processing device, the display and the light source;
    wherein the control application controls the illumination of the light source via interaction with the touch-sensitive display.

2. The device of claim 1, wherein the at least one control button is located on a side of the small computing device.

3. The device of claim 1, wherein the small computing device comprises a personal digital assistant.

4. The device of claim 1, wherein the memory contains organizer software.

5. The device of claim 1, wherein the light source is located at a top end of the small computing device.

6. The device of claim 1, wherein the light source comprises a lamp.

7. The device of claim 1, wherein the light source comprises a light emitting diode.

8. The device of claim 1, wherein the light control button is located on a side of the small computing device.

9. The device of claim 1, wherein the control application is further operative to enable selection of a time period after which the light source is turned off without operation of the light control button.

* * * * *